United States Patent
Hsiao

(10) Patent No.: US 8,308,576 B2
(45) Date of Patent: Nov. 13, 2012

(54) TRANSMISSION MECHANISM OF A CARVING GRINDER

(75) Inventor: Shu Wen Hsiao, Taichung County (TW)

(73) Assignee: We Cheer Industrial Co., Ltd., Taichung County (TW)

( * ) Notice: Subject to any disclaimer, the term of this patent is extended or adjusted under 35 U.S.C. 154(b) by 174 days.

(21) Appl. No.: 12/888,571

(22) Filed: Sep. 23, 2010

(65) Prior Publication Data

US 2012/0077603 A1 Mar. 29, 2012

(51) Int. Cl.
*F16C 1/08* (2006.01)

(52) U.S. Cl. .......................................... 464/53; 451/526

(58) Field of Classification Search .................. 464/52, 464/53; 451/344, 453, 526; 403/342, 383; 81/57.43

See application file for complete search history.

(56) References Cited

U.S. PATENT DOCUMENTS

| 2,586,359 A | * | 2/1952 | Mall | 464/53 |
| 3,219,129 A | * | 11/1965 | Sakuji Yamada | 464/53 X |
| 4,335,585 A | * | 6/1982 | Hoff | 464/52 |

FOREIGN PATENT DOCUMENTS

GB 969571 * 9/1964

* cited by examiner

*Primary Examiner* — Gregory Binda
(74) *Attorney, Agent, or Firm* — Rosenberg, Klein & Lee

(57) ABSTRACT

A transmission mechanism of a carving grinder and particularly to a transmission mechanism of a carving grinder capable of maintaining concentricity during rotation and enhancing stability to reduce transmission wobbling is provided. The mechanism includes a motor and a transmission tube coupled through a motor transmission member. The motor transmission member has a shaft and a driving member with an axle held by two bearings to improve steadiness during rotation of the shaft and axle. The axle has an integrated embossed key at one end to achieve concentricity. The transmission tube and motor transmission member and driving member are coupled through a square pin and a square hole to further enhance rotation steadiness.

3 Claims, 7 Drawing Sheets

TRANSMISSION MECHANISM OF A CARVING GRINDER

BACKGROUND OF THE INVENTION

1. Field of the Invention

The present invention relates to an improvement on the transmission mechanism of a carving grinder, especially to a transmission mechanism of a carving grinder capable of maintaining concentricity when rotating and increasing the stability to reduce run-out in transmission.

2. Description of the Prior Art

A carving grinder seeks primarily to maintain the stability of the machine when rotating, because a perfect and delicate work cannot be achieved without stability of the tool. Accordingly, development and improvement has been going on in the industry. In prior art of carving grinder, US Application No. 2008/0176493A1, for example, disclosed an improved grinding assembly (hereinafter called the "Citation"), which comprises: a motor, a transmission pipe and a handle, wherein the motor can be hung, and the transmission pipe includes a soft hose and a guide pipe which is received in the soft hose, one end of the transmission pipe connected to the motor and the other end connected to a male connector; fitted in the male connector is a bearing; the guide pipe consists of a spiral pipe and a steel cable which extending through the spiral pipe, a distal end of the steel cable connected to a driving member which extends through said bearing and the male connector by an appropriate length; whereby the driving member extends suspended between the bearing and an axle in the handle to avoid the contact of the driving member with the inner periphery of the male connector when the tool is in use. While aiming to increase precision in product by such arrangement, the Citation still has the following drawbacks: using just one bearing is not good enough to reduce the friction between the driving member and the male connector, and the magnitude of vibration due to the driving member run-out when the driving member itself is driven by motor is not dealt with, as only one bearing is provided on the driving member to reduce the friction, despite that the greatest power comes from the motor. Hence the stability of a tool according to Citation has yet to be improved.

Also, in prior art of grinding assembly, the embossed key 61 of transmission axle 60 is made by secondary pressing work (as FIG. 1 shows); as a result, concentricity tends to decrease to an extent that there may be deviation when the axle rotates at high speed. That compromises the precision for the work, which is also an issue the industry has tried hard to tackle.

Furthermore, in prior art, the coupling of the transmission tube 70 and the male connector 71 is joining of a passage 72 and a round hole 73, as FIG. 2 shows, which tends to become loose in fitting from high-speed rotation, which in turn affects the stability of the rotation.

It is thus clear that in prior arts, the problem of run-out in transmission was not much improved, and the drawbacks like compromised concentricity affected the precision and quality.

SUMMARY OF THE INVENTION

In consideration of the above, the author of the present invention made elaborated improvements based on the experience in manufacturing and production over years and developed the present invention, hoping to provide an improved transmission mechanism for carving grinder that is capable of enhanced concentricity when rotating, to reduce run-out in transmission. The present invention comprises a motor that is connected to a transmission tube via a motor transmission member, said transmission tube connected to a working unit via a driving member, in which two bearings are provided on each the shaft of motor transmission member and the transmission axis of driving member to enhances stable rotation of both the shaft and the transmission axis; additionally the embossed key on the transmission axis being an integral one-piece structure ensures the concentricity, while the assembly of transmission tube with motor transmission member and driving member being a fit between square pin and square hole also ensures the stable rotation. As such, with the stability of rotation on both ends of the transmission tube achieved, the multiple drawbacks of prior art can be significantly improved.

The purpose of the present invention is to improve on the stability of the transmission mechanism on carving grinders while rotating, making the rotation remain at a certain magnitude when driving, and further to increase the precision and the quality.

DESCRIPTION OF THE PREFERRED EMBODIMENTS

In order for the features and the embodiments of the present invention to be further understood, a preferred embodiment, together with drawings, is disclosed below.

Figure 2:
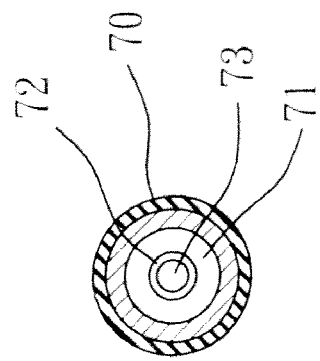
FIG. 2 is a diagram of connection of transmission tube to a male connector in prior arts.
Figure 1:
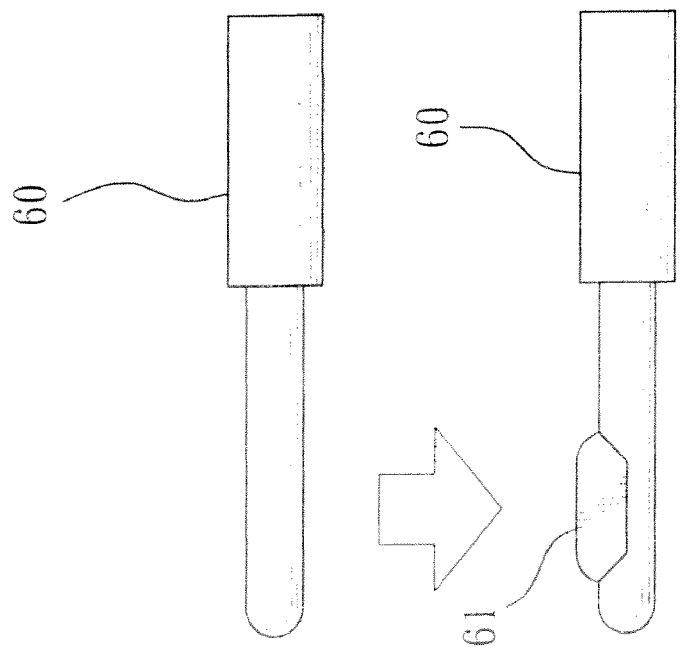
FIG. 1 is a diagram of the forming of the embossed key of a shaft in prior arts.
Figure 3:
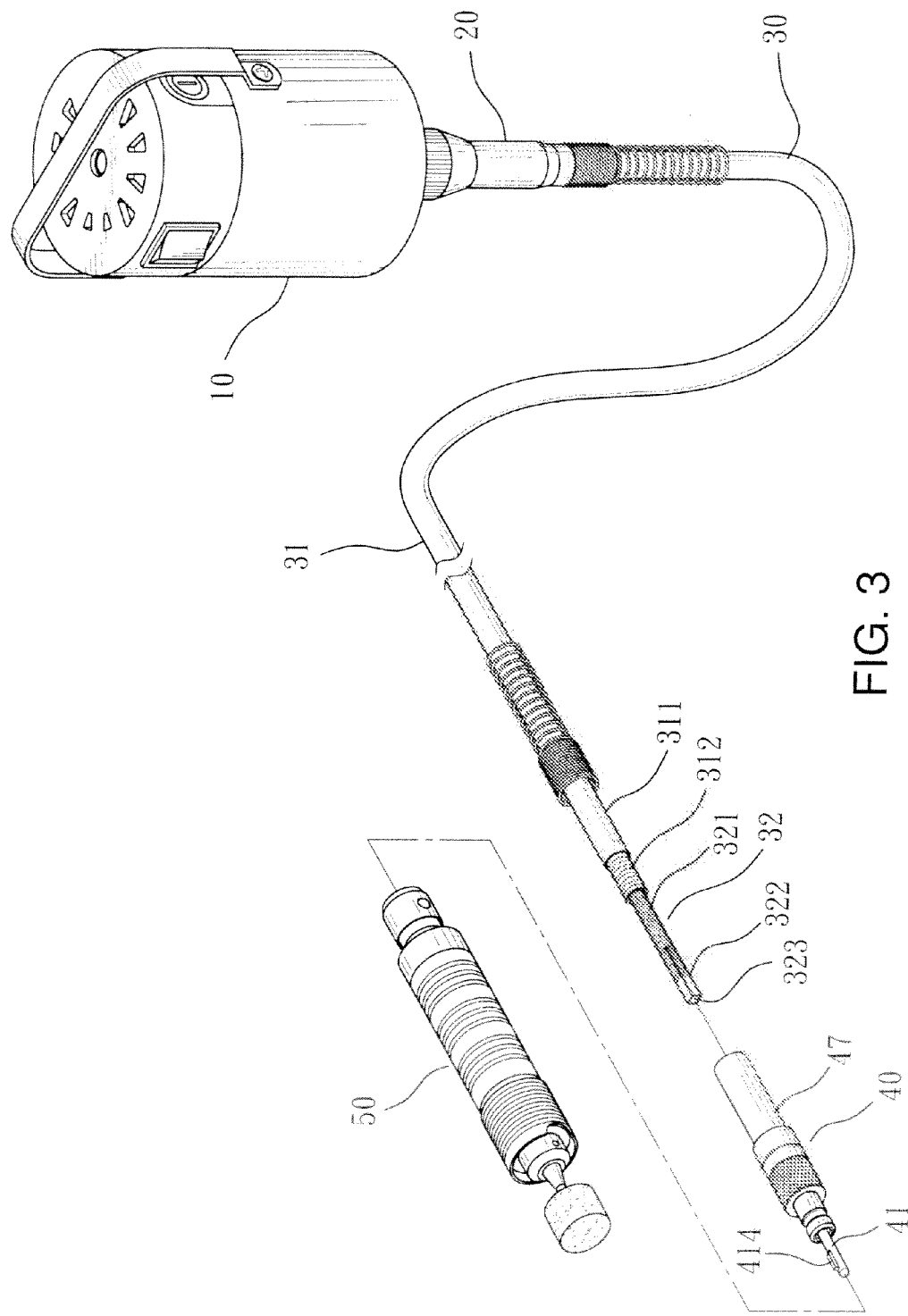
FIG. 3 is an exploded view of an embodiment of the present invention.
Figure 4:
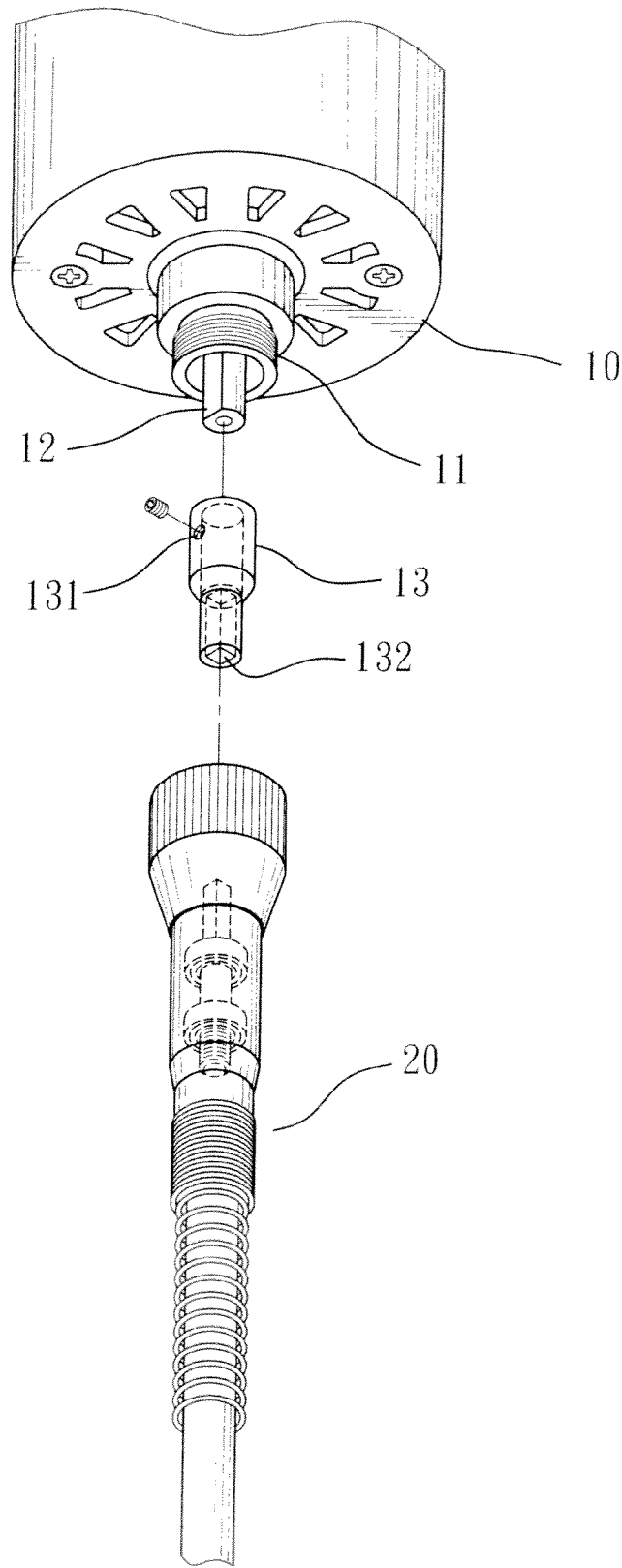
FIG. 4 is a diagram of the motor and the motor transmission member in an embodiment of the present invention.
Figure 5:
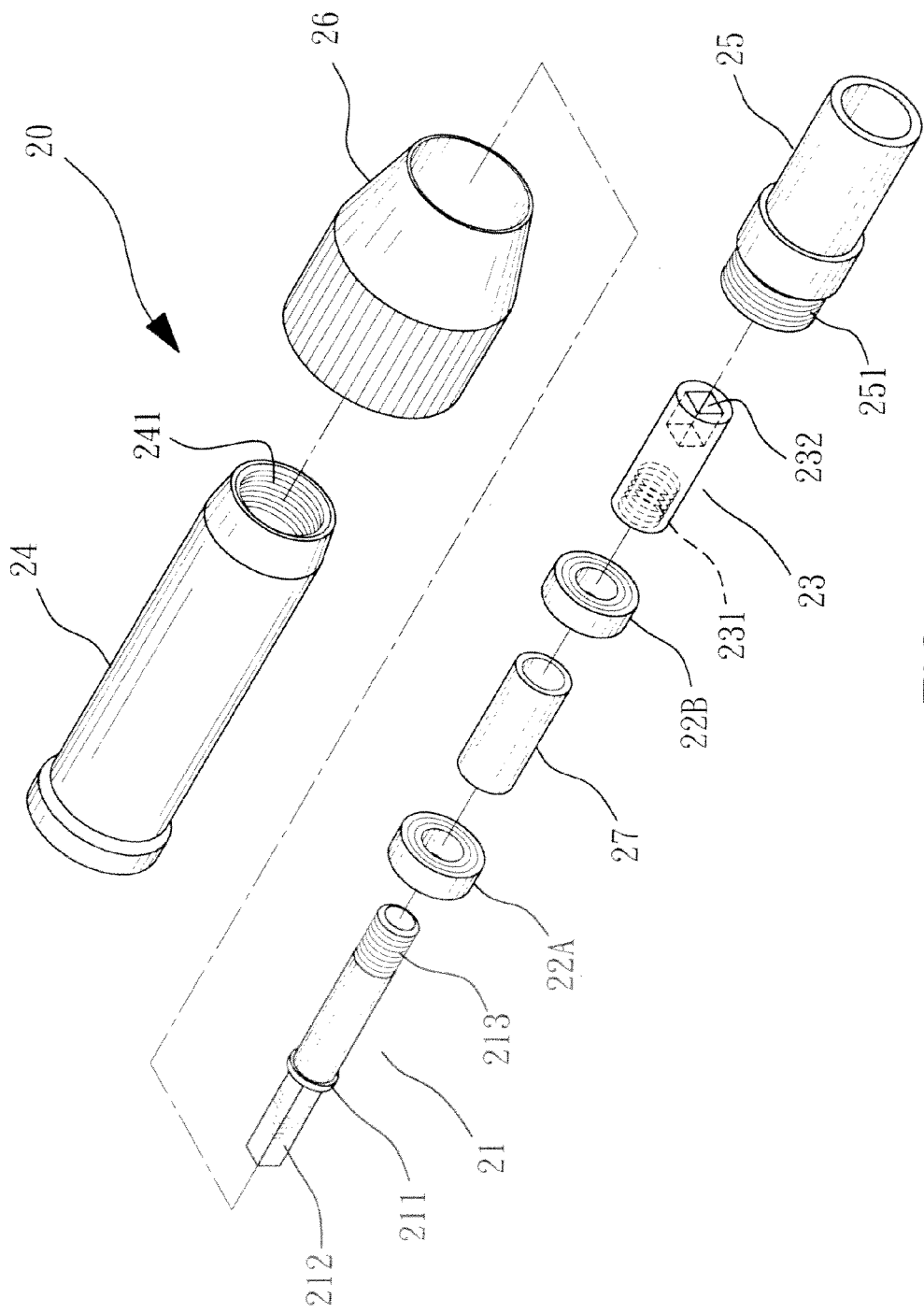
FIG. 5 is an exploded view of the motor transmission member in an embodiment of the present invention.
Figure 6:
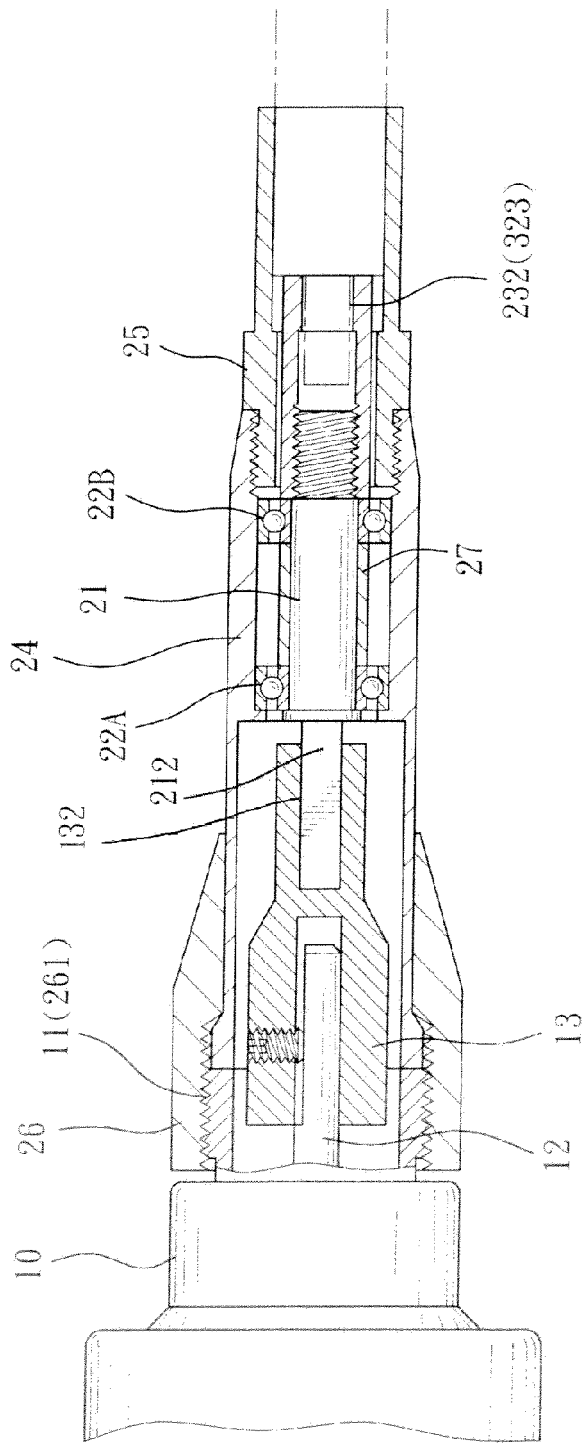
FIG. 6 is a cross-sectional view of the assembly of the motor and the motor transmission member in an embodiment of the present invention.
Figure 7:
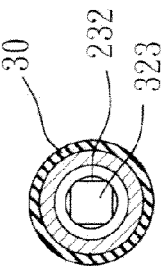
FIG. 7 is a cross-sectional view of the assembly of the transmission tube and the motor transmission member in an embodiment of the present invention.
Figure 8:
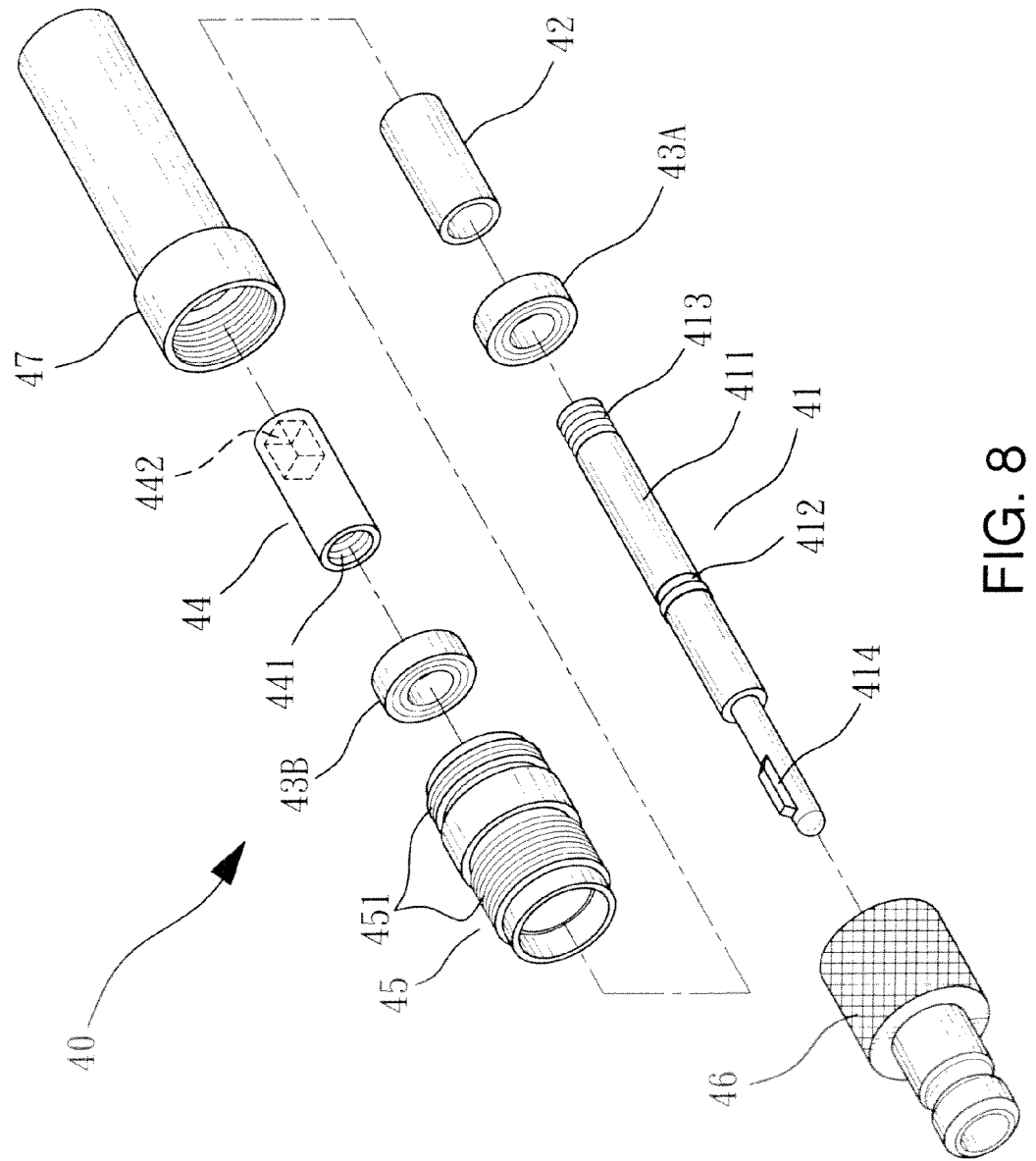
FIG. 8 is an exploded view of the driving member in an embodiment of the present invention.
Figure 9:
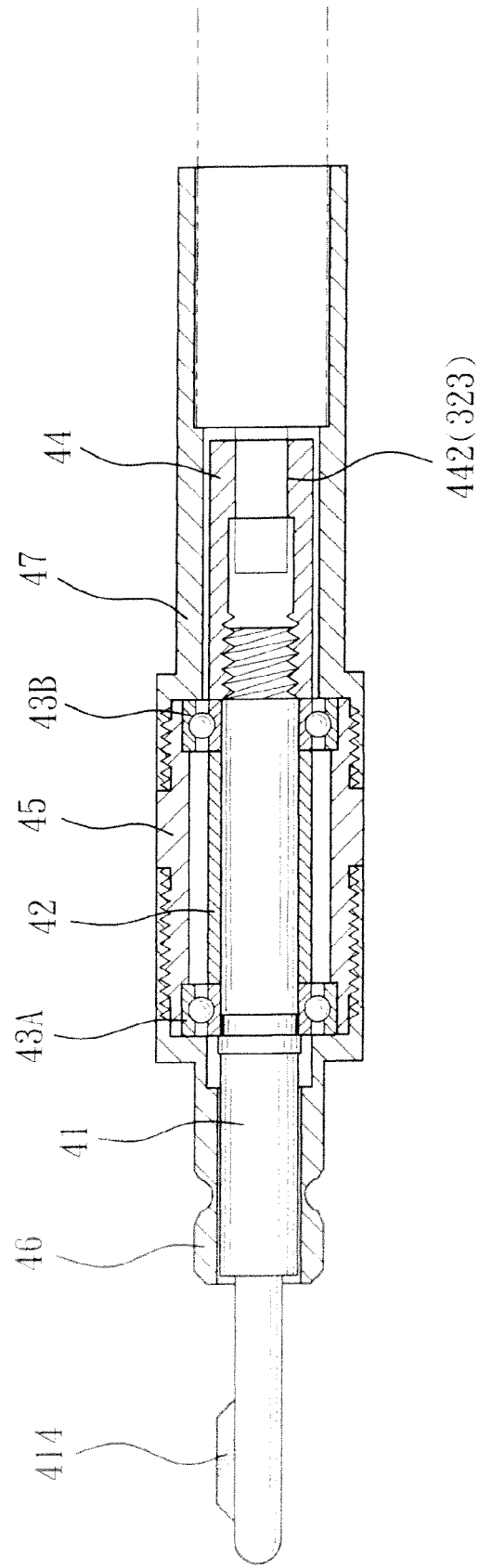
FIG. 9 is a cross-sectional view of the assembly of the same member as in FIG. 8.

Reference is made to FIGS. 3-9. The present invention relates to an improved transmission mechanism for carving grinder, which comprises a motor 10, a motor transmission member 20, the motor being connected to a transmission tube 30 via said motor transmission member 20, the other end of said transmission tube 30 being connected to a working member 50 via a driving member 40; said transmission tube 30 consists of a soft tube 31, which includes a plastic tube 311 clothing a hose 312, and a wire 32, which includes a spiral tube 321 with an axial wire 322 extending therethrough; wherein:

Provided on the end of said motor 10 are a threaded connector 11, which is coupled and bolted with a joining section 26 of the motor transmission member 20, and an axle 12 protruding therefrom; joining this axle 12 is a transmission member 13, which has one end defined by a receiving hole 131 to receive said axle 12 and another end defined by a square positioning hole 132 to receive the shaft 21 of said motor transmission member 20;

Said motor transmission member 20 has a shaft 21, which is provided with a groove 211 to receive a front bearing 22A; to the rear of this front bearing 22A, a front passage 27 and a rear bearing 22B, in such order, are provided fitting around the shaft 21. The front end of shaft 1 is a transmission end 212 which fits into the positioning hole 132 of said motor 10, and the rear end of shaft 21 is a threaded section 213 which joins the female threaded section 231 of a rear passage 23; on the other end of this rear passage 23, a square hole 232 is provided. Said shaft 21 fits into an outer passage 24 which has a threaded section 241 on the inner peripheral of one end to engage with the male thread 251 of a connecting tube 25. On the other end of the outer passage 24, a joining section 26 is provided, which has a female thread 261 to engage with the connector 11 of motor 10;

The axial wire 322 in said transmission tube 30 is in square shape at both ends to define a positioning end each so as to fit into the second socket 44 of a driving member 40 and the square hole 232 of the rear passage on the motor transmission member, respectively;

Said driving member 40 has a transmission axis 41 with a receiving section 411, which has a groove for a bearing 43A to fit around. To the rear of this bearing 43A, a first socket 42 and a bearing 43B, in such order, are provided. The rear section of the transmission axis 41 has a threaded section 413 to engage with the female thread 441 of the second socket 44; said second socket 44 has a square socket 442 on the end; also, it is devised such that the receiving section 411 of the transmission axis 41 fits into a locking socket 45, at each of the two ends of which a threaded section 451 is provided to join a connecting pipe 46 and a joining pipe 47, respectively. In addition, on one end of the transmission axis 41, a one-piece embossed key 414 is provided;

Whereby, when motor 10 rotates, its axle 12 drives the shaft 21 of motor transmission member 20, which in turn drives the axial wire 322 of the transmission tube 30, and when the axial wire 322 rotates, it drives the transmission axis 41 of driving member 40, which in turn drives the working member 50, as the embossed key 414 of transmission axis 41 is coupled with the moving part (e.g., axis) of working member 50. In a mechanism according to the present invention, the motor transmission member 20 and the driving member 40 are designed such that when in rotation, their shaft 21 and transmission axis 41 can rotate more stably because each of them runs on two bearings (22A, 22B and 43A, 43B); moreover, shaft 21 and transmission axis 41 are appropriately spaced from the outer passage 24 and the joining pipe 47, respectively, so that the friction and their wear are decreased and, thus, the service life of the tool lasts longer. Furthermore, in a mechanism according to the present invention, the embossed key 414 of the transmission axis 41 is an integrated one-piece component instead of secondarily machined (pressed) as would be achieved by conventional processes; so, this component has better concentricity which enhances the stability of rotation. Furthermore, when the transmission tube 30 is connected to the motor transmission member 20 and the driving member 40 at both ends, respectively, it is a fit of the positioning end 323 of axial wire 322 with the square holes 232 and 442, which ensures a stable rotation; also, on the motor transmission member 20, the link of transmission end 212 of its shaft 21 with the positioning hole 132 in transmission member 13 of motor 10 is a fit, too, between square pole and square hole, ensuring the stable rotation of transmission tube 30 as well.

Additionally, in a mechanism according to the present invention, because the stability of rotation helps decrease run-out, it becomes possible to alter the diameter of the transmission tube 30 for axial wire 322 to 4.5 mm to shorten the clearance between wire 32 and soft tube 31, to further enhance the stable rotation of axial wire 322.

Synthesizing the above, an "improved transmission mechanism of a carving grinder" according to the present invention has taken into consideration the stability in assembly, the stability of rotation and the concentricity of the components when the transmission tube is connected to the motor transmission member and the driving member at both ends, respectively. Such design intended to safeguard in multiple aspects to ensure of the stable rotation, plus multiple bearings disposed on both the motor transmission member and the driving member, which avoids friction as well as maintains stable rotation to extend the service life of components, has satisfied the industrial utility and inventive step, when these features have not yet disclosed in any published gazette.

I claim:

1. A transmission mechanism of a carving grinder, in which:
    a motor is connected to a first end of a flexibly displaceable transmission tube via a motor transmission member, and said transmission tube is connected on an opposing end to a working unit via a driving member; said transmission tube consists of a soft tube on an outside, which is a hose clad by a plastic tube, and a wire on an inside, which is an axial wire extending through a spiral tube thereby allowing an articulable working unit; wherein:
    both ends of said transmission tube are positioning ends in square shape to be received by a square hole of a second socket on the driving member and by the motor transmission member, respectively;
    said driving member includes a transmission axis with a receiving section, a first bearing is provided on the receiving section, and, behind the first bearing, a first socket and a second bearing, in this order, are provided; in a rear section of the transmission axis, a threaded section of the transmission axis is defined to join a threaded section of a second socket;
    on the opposite end of the second socket, a square hole is provided to receive and position the transmission tube;
    the receiving section of the transmission axis is inserted in a locking socket that has a threaded section on each of front and rear ends, these threaded sections engaging with a connecting tube and a joining tube, respectively;
    said transmission axis is provided a one-piece integrated embossed key on one end.

2. The transmission mechanism of a carving grinder according to claim 1, wherein:
    a distal end of said motor includes a threaded joining section to join and position a joining section of the motor transmission member, and protruding from this end is an axle, onto which a transmission member is fit; an opposite end of the transmission member defines a square positioning hole to receive and position the motor transmission member.

3. The transmission mechanism of a carving grinder according to claim 1, wherein:

said motor transmission member comprises a shaft with a front bearing, a front passage and a rear bearing fitted thereon in such order from a front end to a rear end;

the front end of said shaft is a transmission end, which fits into a positioning hole of the motor and is positioned, and provided on a rear end of the shaft is a thread section to join a female threaded section of a rear passage; on an opposite end of said rear passage a square hole is defined to receive and position the first end of the transmission tube; said shaft fits into an outer passage that is provided with a threaded section on the inner peripheral of one end to join a connecting tube, and on the opposite end of the outer passage a joining section is provided to join and secure the motor.

\* \* \* \* \*